United States Patent Office 3,506,615
Patented Apr. 14, 1970

3,506,615
POLYMERIZATION OF OXYMETHYLENE AND METHYLENE SULFIDE FORMING MONOMERS BY METAL ACETYLACETONATES
Catherine S. H. Chen, Berkeley Heights, N.J., assignor to Celanese Corporation, New York, N.Y., a corporation of Delaware
No Drawing. Filed Jan. 17, 1968, Ser. No. 698,435
Int. Cl. C08g 1/20, 23/00
U.S. Cl. 260—67
9 Claims

ABSTRACT OF THE DISCLOSURE

A method for producing oxymethylene and methylene sulfide polymers by polymerizing such monomers as trioxane and trithiane in the presence of a catalytic amount of a novel metal chelate catalyst. The novel catalysts are a combination of titanyl acetylacetonate and an acetylacetonate selected from the group consisting of ferrous acetylacetonate, ferric acetylacetonate and mixtures thereof.

---

This invention relates to the catalytic polymerization of polymers characterized by recurring —$CH_2X$— units, wherein X is oxygen or sulfur. More particularly it relates to their polymerization by the use of a catalyst system which is a combination of metal acetylacetonates.

Oxymethylene polymers having recurring —$CH_2O$— units have been known for many years. They may be prepared, for example, by the polymerization of anhydrous formaldehyde or by the polymerization of trioxane, which is a cyclic trimer of formaldehyde. The oxymethylene polymers obtained will vary in physical properties such as thermal stability, molecular weight, molding characteristics, color and the like, depending in part, upon their method of preparation and especially the catalytic polymerization technique employed.

Methylene sulfide polymers, the sulfur analog of oxymethylene polymers, somewhat less known to the art, are characterized by recurring —$CH_2S$— units. They may be prepared for example, by the polymerization of the trithiane cyclic trimer of thioformaldehyde.

High molecular weight oxymethylene polymers have been prepared by polymerizing trioxane in the presence of certain fluoride catalysts. For example, they may be prepared in high yields and at rapid reaction rates by the use of catalysts comprising boron fluoride coordination complexes with organic compounds as described in U.S. Patent No. 2,989,506 of Donald E. Hudgin and Frank M. Berardinelli. Other catalysts that have been suggested for use in polymerizing trioxane or formaldehyde alone or with other copolymerizable components in producing oxymethylene polymers are thionyl chloride, fluorosulfonic acid, methanesulfonic acid, phosphorous trichloride, titanium tetrachloride, aluminum trichloride, stannous chloride and stannic chloride. However, the preferred catalysts heretofore employed have been boron trifluoride and the boron fluoride complexes with water and the previously mentioned boron fluoride coordinate complexes with organic compounds, particularly those in which oxygen or sulfur is the donor atom.

These Lewis acid catalysts, and preferably boron trifluoride, have also been used to polymerize trithiane to methylene sulfide polymers. The mechanism is believed to be cationic in nature and similar to that of trioxane polymerization. Dimethyl sulfate has also been used for bulk polymerizations of trithiane, however, this and the $BF_3$ catalysts were found not to form high molecular weight polymers in trithiane solutions.

The above-mentioned polymerization catalysts are of the strong Lewis acid type and are therefore sensitive to the presence of bases, such as water and alcohols. For example, when boron trifluoride or boron trifluoride etherate is placed in water, or even in the presence of water vapor, the boron compound hydrolyzes explosively and forms boron hydroxide. This latter product of the hydrolysis is not a catalyst for the polymerization. If water is present in the reaction zone in amounts over 0.1% there is no polymerization. Also, if water is present in lesser quantities in the reaction zone, the polymerization reaction is susceptible to the chain transfer mechanism which tends to limit molecular weight.

Accordingly, it is an object of the present invention to provide a novel group of catalysts which will yield high molecular weight oxymethylene polymers and copolymers.

It is yet another object of the present invention to provide a novel group of catalysts which will yield high molecular weight methylene sulfide polymers.

It is another object of the present invention to provide a novel group of catalysts which will be less sensitive than the prior art catalysts to the presence of impurities such as water and alcohol, inherently present in the commercial grades of monomers, e.g. cyclic formals, such as trioxane, dioxolane and the like.

It is yet another object of the present invention to provide a novel group of catalysts which will yield high molecular weight oxymethylene polymers and copolymers of higher melting points than are obtainable with the above-mentioned cationic polymerization catalysts of the prior art.

This and other objects of the present invention, as well as the means of effectuating them, will be discussed in greater detail hereinbelow.

It has also been recognized in the prior art that molybdenum acetylacetonate could be used to polymerize trioxane to high molecular weight oxymethylene polymers. Other metal acetylacetonates were tried, but proved to be ineffective. (C. P. Kennedy, W. R. Sorenson, and G. C. McClafin, paper presented at the 150th meeting, Am. Chem. Soc., Atlantic City, N.J., September 1965; Abstracts, p. 667, Polymer Preprint 6 608 (1965)).

Pursuant to the present invention, it has been discovered that by combining titanyl acetylacetonate with either ferric acetylacetonate or ferrous acetylacetonate, or both in various proportions, very effective catalysts for the polymerization or copolymerization of trioxane and the polymerization of trithiane results. Thus, the novel polymerization catalyst stystem of the present invention includes a catalyst comprising titanyl acetylacetonate and either, ferrous acetylacetonate, or ferric acetylacetonate, or mixtures of ferrous acetylacetonate and ferric acetylacetonate.

The catalytic effect of these catalyst systems is both novel and unexpected since either one of the three metal acetylacetonates individually will not catalyze the desired polymerization. Nor is a combination of titanyl acetylacetonates with other ferric or ferrous compounds, e.g. $Fe_2(SO_4)_3$ or $FeCl_2$, catalytically active. The catalyst systems are also very effective catalysts in that they allow control of molecular weight and molecular weight distribution beyond the catalysts of the prior art. This phenomenon is facilitated by the fact that the polymerization reaction is not subject to the interchange reaction, and is similarly insensitive to chain transfer agents.

As these novel catalysts are not as strong Lewis acids as are the fluoride containing catalysts of the prior art, they are relatively insensitive to bases, such as water and alcohols. This lower sensitivity is of great commercial significance in that the monomers polymerized therewith and particularly trioxane, can be of lower purity than is generally required when the catalyst is of the strong Lewis acid type e.g. boron trifluoride or its complexes.

The oxymethylene polymers that may be prepared with our novel metal chelate catalysts include both oxymethylene homopolymers and copolymers.

Oxymethylene homopolymers are prepared by the polymerization of a sole monomer, e.g. trioxane, which yields the recurring ($—CH_2O—$) units. A pure oxymethylene homopolymer of high molecular weight has a good degree of thermal stability but is rendered more stable when the hemiacetal end groups are end-capped. This end-capping is done to prevent depolymerization of the polymer chain and is accomplished by reacting the homopolymeric oxymethylene glycols with carboxylic acid anhydrides, alcohols, alphachloroalkyl ethers, epoxides, isocyanate ethers, acrolein, acrylonitrile and styrene.

Oxymethylene copolymers obtained using our novel catalysts are ones in which there are carbon-to-carbon single bonds in the main polymer chain. These polymers are prepared by polymerizing a source of the oxymethylene moiety, e.g., trioxane, together with a cyclic formal having at least two adjacent carbon atoms, such as 1,3-dioxolane, 1,3-dioxane, and the like. In a preferred embodiment of the present invention the oxymethylene copolymer has at least one chain where R is a divalent radical containing at least two carbon atoms directly linked to each other and positioned in the chain between the two valences, with any substituents on said R radical being inert, that is those which will not induce undesirable reactions. Particularly preferred are copolymers which contain from 60 to 99.6 mol percent of recurring oxymethylene groups. In another embodiment R may be, for example, an alkylene or substituted alkylene group containing at least two carbon atoms.

The term "oxymethylene" as used in the specification and claims of this application unless it is clear from the context that a more specific meaning is intended, includes substituted oxymethylene, wherein the substituents are inert with respect to the reactions in question; that is, the substituents are free from any interfering functional group or groups that would cause or result in the occurrence of undesirable reactions.

The amount of the metal chelate polymerization catalyst employed can be varied within wide limits. Generally a catalytic amount of the catalyst will correspond to a molar ratio of catalyst to monomer of from about 1:100 to about 1:1,000,000, respectively. Preferably, however, the molar ratio of catalyst to monomer in the polymerization zone is from about 1:1,000 to about 1:100,000 respectively.

The make-up of the catalyst may also be varied. Broadly there is from about nine parts (on a molar basis) of titanyl acetlyacetonate to one part ferrous acetylacetonate to about one part titanyl acetylacetonate to nine parts ferrous acetylacetonate is satisfactory. When ferrous acetylacetonate is the second component in the catalyst these same ranges are effective. It is preferred that the catalyst comprise from about five parts titanyl acetylacetonate to one part ferrous or ferric acetylacetonate to about one part titanyl acetylacetonate to five parts ferrous or ferric acetylacetonate. When all of the above components are used as the catalyst it is suggetsed that there be at least one part titanyl acetylacetonate used.

The monomer or plurality of monomers charged to the reaction zone will preferably be substantially anhydrous i.e., at as low a moisture content as can be practically achieved. However, small amounts of moisture, such as may be present in a commercial grade of reactant material or introduced by contact with atmospheric air will not prevent polymerization. It is suggested that this moisture be removed for optimum results, but this removal is no longer critical as it was with the previously employed strong Lewis acid catalysts. With my novel chelate catalyst, polymerization will still occur if water is present in the polymerization zone up to about 2 percent, based on the weight of the monomer.

The polymerization conditions employed with the new catalysts can also vary within wide limits depending upon the makeup of the monomer feed and the type of polymerization system employed. In one specific technique for effecting polymerization (homopolymerization or copolymerization), a source of recurring oxymethylene moieties, e.g., trioxane or other formaldehyde-engendering compound, alone or with another monomer copolymerizable therewith, e.g., a cyclic formal such as 1,3-dioxolane, with or without a chain branching agent, are blended with the catalyst in a solvent for the monomers such as cyclohexane or benzene. The polymerization is then permitted to proceed in the sealed reaction zone. The temperature in the reaction zone may vary from, for example, about 40° C. to about 120° C. Preferably the temperature of the solution is maintained at about 100° C. for the period of from about 5 minutes to about 72 hours. The polymerization reaction may be effected under pressures ranging from sub-atmospheric to 100 atmospheres or more.

Various other solvents can be used for the solution polymerization of trioxane, among which are alkyl derivatives of cyclohexane, the substituted derivatives of benzene, preferably those in which the substituents are electron withdrawing substituents, and especially electron withdrawing substituents such as the halogens, e.g., the chlorobenzenes, chlorinated aliphatic hydrocarbons, e.g., methylene dichloride and saturated and unsaturated aliphatic esters such as ethylacetate and methylacrylate which are solvents for the catalysts also. Straight chain aliphatic hydrocarbons are preferred for the heterogenous suspension systems. When the heterogenous suspension polymerization is the type employed, crystalline trioxane in a liquid medium, the temperatures should be maintained between about 10° and 60° C., with the preferred range from about 40° C. to about 60° C.

Polymerization may also be carried out in bulk when the source of the recurring oxymethylene moieties is trioxane. In such cases the temperatures in the reaction zone may vary from about 65° C. to about 120° C., with the preferred range from about 65° C. to about 100° C.

When trithiane is the methylene sulfide forming monomer the polymerization may also be carried out either in bulk, solution, or heterogenous form. In bulk, the reaction temperature may vary from about 215° C. to about 225° C. with the preferred temperature about 215° C. The solution or suspension type of polymerization should be carried out between about 100° C. and about 200° C., preferably about 150° C. Suitable solvents include chlorobenzene, biphenyl, phthalic anhydride, and cyclohexane.

There is no critical mixing sequence when using the metal acetylacetonate catalysts of the instant invention. The acetylacetonate catalyst can be premixed in the proper proportions and added to the monomer in the polymerization zone or the components may be added separately in any order. However, it is preferred that the catalyst is premixed and then added to the monomers after the monomers are mixed in bulk, solvent or the heterogenous polymerization systems.

After the polymerization reaction is complete excess monomer present in the polymerization zone can be removed by solvent extraction. For example, when trioxane is polymerized in cyclohexane the resulting oxymethylene polymer can be washed in a water-acetone mixture before drying. When trithiane is polymerized in biphenyl the resulting methylene sulfide polymer and biphenyl mixture can be treated with hot N-methyl-2-pyrrolidone.

In order that those skilled in the art may better understand how the present invention can be carried into effect, the following examples are given by way of illustration and not by way of limitation. All parts and percentages are by weight unless otherwise stated.

Examples I through IV verify the findings of the prior art that the use of only one of the metal acetylacetonates as a polymerization catalyst for trioxane is ineffective.

EXAMPLE I

The polymerization of trioxane in the melt form was attempted with titanyl acetylacetonate as the catalyst. Trioxane (5 grams) was melted in an open test tube by the use of a heat gun. Five milligrams of titanyl acetylacetonate were added to the melt. The orange acetylacetonate dissolved in the trioxane melt and turned the while melt to pale yellow but no polymerization took place.

While the yellow mixture was still melted, a minute amount of ferrous acetylacetonate was added to the melt. Polymerization commenced immediately changing the melt into a solid mass.

EXAMPLE II

All the procedures of Example I were followed. After the titanyl acetylacetonate was added to the trioxane melt, no polymerization took place.

Upon adding ferrous acetylacetonate to the yellow melt, polymerization commenced immediately changing the melt into a solid mass.

EXAMPLE III

The procedure of Example I was followed with a small amount of ferrous acetylacetonate added to the trioxane melt. The melt turned orange-red, but after heating for 10 minutes there was no polymerization.

To this orange-red mixture was added a small amount of titanyl acetylacetonate. Polymerization commenced immediately turning the mixture into a solid mass.

EXAMPLE IV

All the procedures of Example III were followed except ferric acetylacetonate was used in place of ferrous acetylacetonate. After the titanyl acetylacetonate was added, instantaneous polymerization followed.

Examples V through Example VIII illustrate the copolymerization of trioxane and a cyclic formal in the melt form using my novel catalysts.

EXAMPLE V

A mixture of 103 grams of trioxane and 5 grams of 1,3-dioxane was placed in a polymerization tube and heated to 65° C. The monomer mixture melted and the temperature in the tube was maintained at 65° C. Then 0.0359 grams of ferric acetylacetonate and 0.0270 grams of titanyl acetylacetonate were added. A reddish brown solution resulted.

After 8 hours, 79.2 grams of copolymer, corresponding to a yield of 65 percent, was obtained. The polymer had an inherent viscosity (I.V.) value of 0.72. The inherent viscosity in this example and the following examples was measured at 60° C. in a 0.1 weight percent solution in p-chlorophenol containing 2 weight percent alpha-pinene.

EXAMPLE VI

The procedure of Example V was followed using the following reactants:

| | Grams |
|---|---|
| Trioxane | 103 |
| 1,3-dioxane | 5 |
| Ferric acetylacetonate | 0.00680 |
| Titanyl acetylacetonate | 0.00525 |

A yield of 10 percent copolymer was obtained which had an I.V. value of 1.2.

EXAMPLE VII

The procedure of Example V was followed using the following reactants:

| | Grams |
|---|---|
| Trioxane | 103 |
| 4-methyl-m-dioxane | 5 |
| Ferric acetylacetonate | 0.0071 |
| Titanyl acetylacetonate | 0.00530 |

A reddish brown solution resulted after addition of the catalyst to the monomer melt.

A yield of 30 percent copolymer was obtained after 3 hours of polymerization and the copolymer had an I.V. value of 1.12.

EXAMPLE VIII

The procedure of Example V was again followed using the following reactants:

| | Grams |
|---|---|
| Trioxane | 103 |
| 4-methyl-m-dioxane | 5 |
| Ferric acetylacetonate | 0.0021 |
| Titanyl acetylacetonate | 0.0026 |

A yield of 26 percent of white copolymer was obtained after 8 hours of polymerization. The copolymer had an I.V. value of 1.72.

EXAMPLE IX

This example illustrates the solution polymerization of trioxane in cyclohexane using a titanyl acetylacetonate-ferric acetylacetonate catalyst.

The polymerization was carried out in a polymerization tube containing 41.1 parts of trioxane and 20 parts of cyclohexane. The trioxane and cyclohexane were previously purified by refluxing and distilling over sodium. To this solution was added 0.0118 parts of titanyl acetylacetonate and 0.0166 parts of ferric acetylacetonate (1:1 mole ratio). The tube was flushed with dry argon for five minutes and then immediately capped.

After the addition of the metal acetylacetonates catalyst the solution turned red in color. The tube was placed into a 100° C. oil bath, and the red solution turned pale yellow in seven minutes as the polymerization began. The polymerization reacton proceeded very rapidly and a solid mass formed within the next two minutes. The tube was kept in the oil bath (100° C.) for the next 30 minutes.

After the polymer was collected it was washed with a water-acetone mixture and dried. The oxymethylene polymer collected has a melting point of 180° C. and an inherent viscosity (I.V.) value of 0.74–0.77.

EXAMPLE X

All the procedures of Example IX were repeated except that 1,3-dioxolane was used as a comonomer with the trioxane. A solid white copolymer resulted which was washed with a water-acetone mixture and dried.

EXAMPLE XI

This example illustrates the solution polymerization of trioxane in cyclohexane using a titanyl acetylacetonate ferric acetylacetonate catalyst.

The procedure of Example IX was followed using the following reactants:

44 parts trioxane
20 parts cyclohexane
0.0117 part titanyl acetylacetonate } (2.1 mole ratio)
0.0085 part feric acetylacetonate Polymerization took place rapidly and essentially quantitative conversion was achieved within 30 minutes.

The collected oxymethylene polymer has a melting point of 180° C. and an I.V. value of 0.71–0.72.

EXAMPLE XII

All the procedures of Example XI were repeated except that 1,3-dioxolane was used as a comonomer with the trioxane. A solid white copolymer resulted which was washed with a water-acetone mixture and dried.

EXAMPLE XIII

This example illustrates the copolymerization of trioxane and m-dioxane in solution.

The procedures described in Example IX were repeated using the following reactants:

45.8 parts trioxane
1.9 parts m-dioxane
25 parts cyclohexane
0.012 part titanyl acetylacetonate
0.017 part ferric acetylacetonate } (1:1 mole ratio)

Polymerization commenced within two minutes and proceeded rapidly to completion. After washing and drying the copolymer product has a melting point of 184° C. and an I.V. value of 0.98. The percent of m-dioxane in the copolymer is 1.3 percent, equivalent to 0.46 mole percent of (—CH$_2$CH$_2$CH$_2$O—) based an (—CH$_2$O—).

EXAMPLE XIV

This example illustrates the solution polymerization of trithiane using titanyl acetylacetonate-ferric acetylacetonate as a catalyst.

The polymerization was carried out in a polymerization tube containing 46 parts of trithiane, 23 parts of biphenyl (as the solvent), 0.087 parts of titanyl acetylacetonate and 0.11 part of ferric acetylacetonate (1.1 mole ratio). The tube was immediately capped after the reactants were added and flushed with nitrogen for ten minutes by means of a hypodermic needle. The polymerization tube was placed into a 190° C. oil bath overnight.

The polymer was collected and washed with hot N-methyl-2, pyrrolidone, benzene and acetone and then dried. Essentially quantitative polymerization was obtained and the polymer has a melting point of 257° C. The polymer is grey in color and treatment with ammonia at 100° C. did not improve the color.

While this last example illustrates the preparation of a methylene sulfide polymer from trithiane, it is also within the scope of my invention to make a methylene sulfide polymer containing substituted thiomethylene groups, from substituted trithianes, e.g., having aryl or alkyl substituents. Preferred, are those substituents which do not enter into any substantial undesirable side reactions.

After polymerization it is generally desirable to incorporate stabilizers into the oxymethylene polymer in order to increase its thermal stability. For example, the thermal stability of oxymethylene polymers and copolymers is enhanced by incorporation therein of at least one amidine compound, i.e. a compound having a carbon atom doubly bonded to one nitrogen atom and singly bonded to another. Preferred amidine compounds are the N-substituted amidine compounds wherein another nitrogen atom is singly bonded to the amidino group, most preferably at the carbon atom. Another preferred class of amidine compounds is that in which the carbon atom of the amidino group is bonded to another carbon atom, an oxygen atom or a hydrogen atom. A detailed description of suitable amidine compounds may be found in U.S. Patent No. 3,313,767 issued on Apr. 11, 1967 to Frank M. Berardinelli and Raymond J. Kray, and Thomas J. Dolce.

The polymer composition may also contain a phenolic material preferably an alkylene bisphenol, as a thermal stabilizer. It appears that the stabilization action of the amidine compounds and of the phenols enhance each other so that a mixture of a stabilizer of each class is more effective than a comparable amount of stabilizer of either class by itself.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol); 2,2'-ethylene bis-(4-methyl-6-tertiary butyl phenol); 4,4'-ethylidene bis-(6-tertiary butyl-3-methyl phenol); and 4,4'-butylidene bis-(6-tertiary butyl-3-methyl phenol). Suitable phenolic stabilizers other than alkylene bisphenols include 2,6-ditertiary butyl-4-methyl phenol, octyl phenol and p-phenyl phenol.

Particularly effective are the mixtures in all proportions of at least two amidine compounds and a phenolic stabilizer such as the mixture of a cyanoguanidine, an amine-substituted triazine, and an alkylene bisphenol. The most preferred such stabilizer combinations employ a melamine compound as the amine substituted triazine.

While the amidine-phenolic compound stabilizer system imparts the desired thermal stability, with certain systems the stabilized polymer may exhibit slight undesirable exudation upon maintenance for extended periods of time at elevated temperatures. Similarly, certain other such systems may result in the stabilized polymer exhibiting undesirable color characteristics.

Melamine compound-cyanoguanidine compound admixtures have been found to optimize thermal and structural stability and color properties of the stabilized polymer, and in some instances represent an improved stabilizer system over the use of either amidine compound alone. Most preferably, the stabilizer system comprises a melamine compound, a cyanoguanidine compound, and a phenolic material such as the alkylene bisphenols.

The amidine compounds are generally admixed with the oxymethylene polymer in amounts not exceeding 5% based on the weight of the oxymethylene polymer, preferably in amounts between about 1 and 0.01 weight percent. The alkylene bisphenol, when used, is admixed in amounts not exceeding 5 weight percent and preferably from about 1 to about 0.01 weight percent, most preferably 1 to 0.3 weight percent, based on the weight of the oxymethylene polymer.

While the mixtures of amidines, and mixtures therewith of phenolic stabilizers, may be employed in all proportions, in a preferred embodiment the stabilizer system comprises from about 0.01 to 0.2 weight percent of an amine substituted triazine, and from .05 to 1.0 weight percent of a cyanoguanidine most preferably in combination with from about 0.3 to 1.0 weight percent of an alkylene bisphenol.

The amidine compounds, and the alkylene bisphenols, if desired, may be admixed intimately with the oxymethylene polymer by being applied in solution in a suitable solvent to the finely divided solid oxymethylene polymer followed by evaporation of the solvent.

The admixture may also be made by dry blending the finely divided oxymethylene polymer and finely divided stabilizers and by milling the stabilizers into the polymer as the latter is worked on a rubber mill.

The oxymethylene polymer produced by the metal acetylacetonate catalyst of the instant invention may also include if desired, plasticizers, pigments and other stabilizers such as those which are stabilizers against degradation by ultraviolet light by the addition of, for example, about 1% by weight of 2,2'-dihydroxy-4,4'-dimethoxybenzophenone; 2-hydroxy-4-methoxy-benzophenone, 2-hydroxy-4-methoxy-4'-chlorobenzophenone, and the like, based on the weight of the oxymethylene polymer.

It is to be understood that the foregoing detailed description is given merely by way of illustration and that many other variations may be made therein without departing from the spirit of my invention as defined in the following claims.

The embodiments of the invention in which an exclusive property or privilege is claimed are defined as follows:

1. A process for producing polymers characterized by recurring —CH$_2$O— or —CH$_2$S— moieties, which comprises, polymerizing at least one monomer selected from the group consisting of trioxane and trithiane, in the presence of a catalytic amount of a metal acetylacetonate catalyst, said catalyst being a mixture of titanyl acetylacetonate and an acetylacetonate selected from the group consisting of ferrous acetylacetonate, ferric acetylacetonate and mixtures thereof.

2. The process of claim 1 wherein said catalyst is a mixture of titanyl acetylacetonate and ferrous acetylacetonate.

3. The process of claim 1 wherein said catalyst is a mixture of titanyl acetylacetonate and ferrous acetylacetonate.

4. The process of claim 1 wherein said catalyst is a mixture of titanyl acetylacetonate and a mixture of ferrous acetylacetonate and ferric acetylacetonate.

5. The process of claim 1 wherein said monomer is trioxane.

6. The process of claim 1 wherein said monomer is selected from the group consisting of trioxane and mixtures of trioxane with at least one cyclic formal, and wherein said trioxane constitutes at about 40 mole percent of the mixture, in the presence of a catalytic amount of a metal acetylacetonate catalyst which is a mixture of titanyl acetylacetonate and an acetylacetonate selected from the group consisting essentially of ferrous acetylacetonate, ferric acetylacetonate and mixtures thereof.

7. The process of claim 1 wherein said monomers are trioxane and 1,3-dioxolane.

8. The process of claim 1 wherein said monomers are trioxane and 1,3-dioxane.

9. The process of claim 1 wherein said monomer is trithiane.

References Cited

UNITED STATES PATENTS

| | | | |
|---|---|---|---|
| 3,267,076 | 8/1966 | Ishii et al. | 260—67 |
| 3,300,445 | 1/1967 | Sidi | 260—67 |
| 3,305,529 | 2/1967 | Reynolds | 260—67 |
| 3,306,878 | 2/1967 | Barton et al. | 260—67 |
| 3,313,765 | 4/1967 | Roberts et al. | 260—67 |
| 3,457,227 | 7/1969 | Kennedy. | |

WILLIAM H. SHORT, Primary Examiner

L. M. PHYNES, Assistant Examiner

U.S. Cl. X.R.

260—45.9, 45.95, 79